(12) United States Patent
Carroll

(10) Patent No.: US 11,071,958 B2
(45) Date of Patent: Jul. 27, 2021

(54) PARTICLE DISENGAGEMENT DEVICE

(71) Applicant: SHELL OIL COMPANY, Houston, TX (US)

(72) Inventor: Cian Seamus Carroll, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/833,930

(22) Filed: Mar. 30, 2020

(65) Prior Publication Data
US 2020/0222870 A1 Jul. 16, 2020

Related U.S. Application Data

(62) Division of application No. 15/776,657, filed as application No. PCT/US2016/063217 on Nov. 22, 2016, now Pat. No. 10,661,240.
(Continued)

(51) Int. Cl.
| | |
|---|---|
| C07C 1/00 | (2006.01) |
| B01J 8/18 | (2006.01) |
| B01J 8/00 | (2006.01) |
| B01J 8/24 | (2006.01) |
| B01D 45/08 | (2006.01) |
| B01D 45/04 | (2006.01) |
| B04C 5/26 | (2006.01) |
| B04C 9/00 | (2006.01) |
| C10G 11/18 | (2006.01) |

(52) U.S. Cl.
CPC ............ *B01J 8/0065* (2013.01); *B01D 45/04* (2013.01); *B01D 45/08* (2013.01); *B01J 8/0055* (2013.01); *B01J 8/18* (2013.01); *B01J 8/24* (2013.01); *B04C 5/26* (2013.01); *B04C 9/00* (2013.01); *C10G 11/18* (2013.01); *B01J 2208/00849* (2013.01); *B01J 2208/00991* (2013.01)

(58) Field of Classification Search
CPC . B01J 8/18; B01J 8/0065; B01J 8/0055; B01J 8/24; B01D 45/04; B01D 45/08; B04C 5/26; B04C 9/00; C01G 11/18
See application file for complete search history.

(56) References Cited

U.S. PATENT DOCUMENTS

| | | | |
|---|---|---|---|
| 2,944,009 A * | 7/1960 | Russell | B01D 3/22 208/155 |
| 4,578,366 A | 3/1986 | Cetinkaya et al. | |
| (Continued) | | | |

FOREIGN PATENT DOCUMENTS

| | | |
|---|---|---|
| CN | 103285785 A | 9/2013 |
| CN | 104511262 A | 4/2015 |
| (Continued) | | |

OTHER PUBLICATIONS

International Search Report and Written Opinion received for PCT Application No. PCT/US2016/063217, dated Feb. 24, 2017, 11 pages.

*Primary Examiner* — Robert A Hopkins
(74) *Attorney, Agent, or Firm* — Shell Oil Company

(57) ABSTRACT

A particle disengagements device comprising a baffle plate, wherein the baffle plate comprises one or more guide baffles and one or more separation baffles, wherein the one or more guide baffles and the one or more separation baffles define one or more air flow paths and one or more solid flow paths and associated systems and methods.

16 Claims, 5 Drawing Sheets

Related U.S. Application Data

(60) Provisional application No. 62/259,126, filed on Nov. 24, 2015.

(56) References Cited

U.S. PATENT DOCUMENTS

| | | | |
|---|---|---|---|
| 4,877,431 | A | 10/1989 | Avondoglio |
| 4,963,328 | A | 10/1990 | Haddad et al. |
| 5,288,397 | A | 2/1994 | Markham et al. |
| 7,077,997 | B1 | 7/2006 | Sandacz |
| 7,799,118 | B2 | 9/2010 | Beech |
| 7,829,030 | B2 * | 11/2010 | Beech, Jr. .............. B01J 8/0055 422/139 |
| 2002/0000409 | A1 | 1/2002 | Lanting et al. |
| 2002/0008052 | A1 | 1/2002 | Hedrick |
| 2005/0043577 | A1 | 2/2005 | Beech, Jr. et al. |
| 2009/0107092 | A1 | 4/2009 | Mehlberg |
| 2013/0186273 | A1 | 7/2013 | Llamas et al. |
| 2015/0283530 | A1 | 10/2015 | Johnson |

FOREIGN PATENT DOCUMENTS

| | | |
|---|---|---|
| EP | 0095011 A2 | 11/1983 |
| RU | 2462300 C2 | 9/2012 |

* cited by examiner

PARTICLE DISENGAGEMENT DEVICE

CROSS-REFERENCE TO RELATED APPLICATON

This application is a divisional of U.S. patent application Ser. No. 15/776,657, filed May 16, 2018, which is the National Stage (35 U.S.C. 371) of International Application No. PCT/US2016/0603217, filed Nov. 22, 2016, which claims priority from the U.S. Provisional Application No. 62/259,126, filed Nov. 24, 2015, which is incorporated herein by reference.

BACKGROUND

The present disclosure generally relates to particle disengagement devices. More specifically, in certain embodiments the present disclosure relates to particle disengagement devices useful in separation vessels and associated methods and systems.

In a typical Fluid Catalytic Cracking Unit (FCCU), finely divided regenerated catalyst is drawn from a regenerator through a regenerator standpipe and contacts with a hydrocarbon feedstock in a lower portion of a reactor riser. Hydrocarbon feedstock and steam enter the riser through feed nozzles. The mixture of feed, steam and regenerated catalyst, which has a temperature of from about 200° C. to about 700° C., passes up through the riser reactor, converting the feed into lighter products while a coke layer deposits on the surface of the catalyst, temporarily deactivating the catalyst.

The hydrocarbon vapors and catalyst from the top of the riser are then passed through cyclones to separate spent catalyst from the hydrocarbon vapor product stream. The spent catalyst enters a stripper where steam is introduced to remove hydrocarbon products from the catalyst. The spent catalyst then passes through a spent catalyst standpipe to enter the regenerator where, in the presence of gas and at a temperature in the range of from about 620° C. to about 760° C., the coke layer on the spent catalyst is combusted to restore the catalyst activity. Regeneration is typically performed in a vessel comprising a fluidized bed and one or more cyclones.

Currently, the cyclone loadings are designed to manage the full bed entrainment rate. However, amount of wear is proportional to loading rate. Thus, cyclones with high loading rates are susceptible to high rates of wear.

It is desirable to develop a way of reducing the cyclone loading rate in separation vessels to extend the life of cyclones.

SUMMARY

The present disclosure generally relates to particle disengagement devices. More specifically, in certain embodiments the present disclosure relates to particle disengagement devices useful in separation vessels and associated methods and systems.

In one embodiment, the present disclosure provides a particle disengagement device comprising a baffle plate, wherein the baffle plate comprises one or more guide baffles and one or more separation baffles, wherein the one or more guide baffles and the one or more separation baffles define one or more air flow paths and one or more solid flow paths.

In another embodiment, the present disclosure provides a vessel comprising: a fluidized bed, one or more cyclones, and a particle disengagement device, wherein the particle disengagement device is disposed within the vessel at an elevation above the fluidized bed and below a portion of the one or more cyclones.

In another embodiment, the present disclosure provides a method comprising: providing a vessel, wherein the vessel comprises a fluidized bed, one or more cyclones, and a particle disengagement device, wherein the particle disengagement device is disposed within the vessel at an elevation above the fluidized bed and below a portion of the one or more cyclones; and introducing an air/catalyst feed into the vessel.

BRIEF DESCRIPTION OF THE DRAWINGS

A more complete and thorough understanding of the present embodiments and advantages thereof may be acquired by referring to the following description taken in conjunction with the accompanying drawings.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure generally relates to particle disengagement devices. More specifically, in certain embodiments the present disclosure relates to particle disengagement devices useful in separation vessels and associated methods and systems.

It has been believed that the placement of a particle disengagement device or baffle between a fluidized bed and a cyclone was undesirable as this would greatly increase the overall pressure drop in the vessel. However, it has recently been discovered that not only does the placement of a particle disengagement device or baffle between the fluidized bed and the cyclone not greatly increase the pressure drop, it also allows for the reduction of the entrainment rate and hence the solids loading of cyclones in a fluidized bed. With the reduction of cyclone loading, the amount of wear on the cyclone can be reduced and the cyclone capacity requirement may be increased. In addition, the top disengaging height may also be reduced allowing for the cyclone to be lower than the conventional vessels.

In certain embodiments, the particle disengagement devices discussed herein comprise a series of baffles that force flows of gas and solids up through the particle disengagement device along a curved path forcing segregation and densification of the solid phase. In certain embodiments, the particle disengagement devices discussed herein may be inserted into a vessel operating with a fluidized bed. In certain embodiments, the particle disengagement devices discussed herein may reside between the top of the dense phase bed and the cyclone inlet elevation. In certain embodiments, the particle disengagement devices discussed herein may be mounted a distance above the bed height and may be used to control the amount of bed entrainment that passes this location as well as reduce the transport disengagement height.

Figure 1:
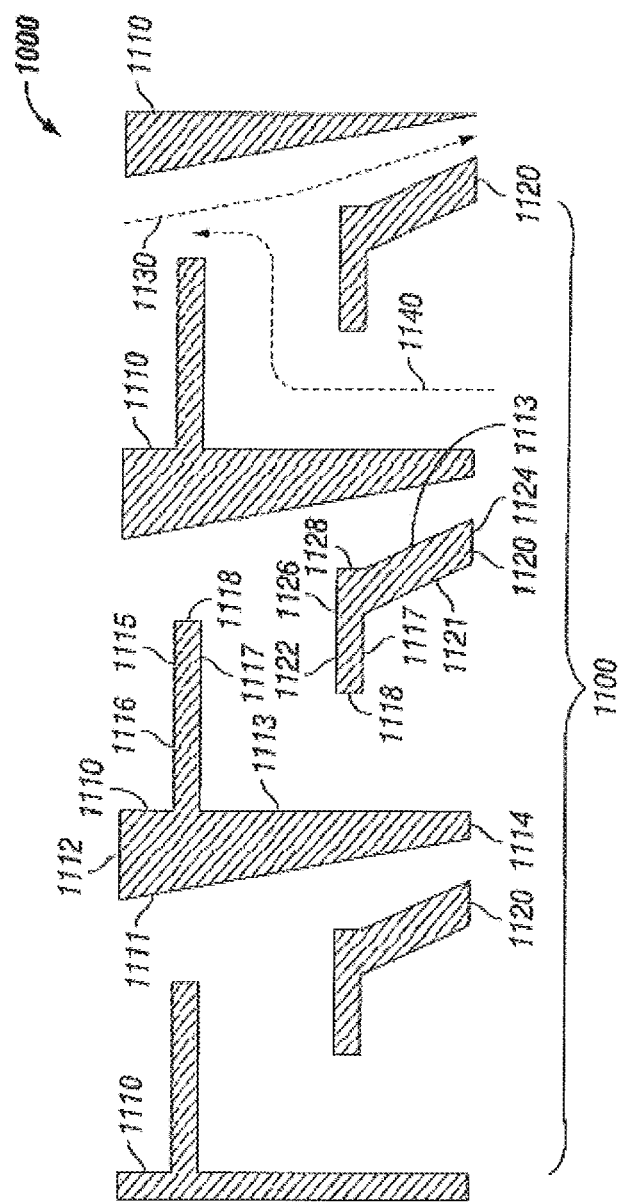
FIG. 1 illustrates a cross sectional view of a particle disengagement device in accordance with certain embodiments of the present disclosure.

Referring now to FIG. 1, FIG. 1 illustrates a cross sectional view of particle disengagement device 1000 in accordance with certain embodiments of the present disclosure. In certain embodiments, particle disengagement device 1000 may comprise a baffle plate 1100.

In certain embodiments, baffle plate 1100 may be constructed out of carbon steel. In other embodiments, baffle plate 1100 may be constructed out of carbon steel with an erosion resistance coating, ceramics, and/or ceramets.

In certain embodiments, baffle plate 1100 may be a circular baffle plate. In certain embodiments, baffle plate 1100 may have a diameter in the range of from 20 inches (0.5 meter) to 800 inches (20.3 meters). In certain embodiments, baffle plate 1100 may have a diameter in the range of from 40 inches (1 meter) to 200 inches (5 meters). In certain embodiments baffle plate 1100 may have a diameter in the range of from 4 inches (0.1 meters) to 20 inches (0.5 meters). In certain embodiments, baffle plate 1100 may have a diameter equal to the inner diameter of a vessel comprising a fluidized bed. In other embodiments, baffle plate 1100 may be a non-circular baffle plate. In certain embodiments, baffle plate 1100 may have a rectangular cross section.

In certain embodiments, baffle plate 1100 may have a height in the range of from 1 inch to 60 inches. In certain embodiments, baffle plate 1100 may have a height in the range of from 5 inches to 25 inches. In certain embodiments, baffle plate 1100 may have a height of 13 inches.

In certain embodiments, baffle plate 1100 may comprise one or more guide baffles 1110 and one or more separation baffles 1120. In certain embodiments, baffle plate 1100 may comprise one, two, three, four, five, or six guide baffles 1110 and/or one, two, three, four, five, or six separation baffles 1120. In certain embodiments, baffle plate 1100 may comprise 10 to 60 guide baffles 1110 and/or 10 to 60 separation baffles 1120. In certain embodiments, baffle plate 1100 may comprise 20 to 40 guide baffles 1110 and/or 20 to 40 separation baffles 1120. In certain embodiments, as shown in FIG. 1, a cross section of baffle plate 1100 may comprise four guide baffles 1110 and three separation baffles 1120.

In certain embodiments, each of the one or more guide baffles 1110 along a cross section of particle disengagement device 1000 may be uniform. In certain embodiments, each of the one or more separation baffles 1120 along a cross section of particle disengagement device 1000 may be uniform. In other embodiments, as shown in FIG. 1, the outer most guide baffles 1110 and/or separation baffle 1120 along a cross section of particle disengagement device 1000 may only comprise partial guide baffles 1110 and/or separation baffles 1120.

Figure 2:
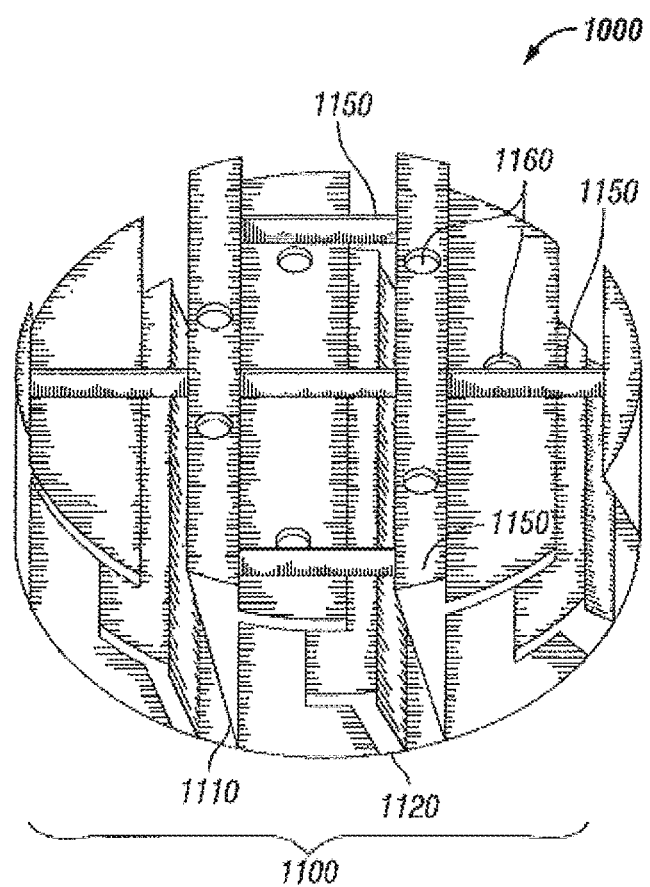
FIG. 2 illustrates a particle disengagement device in accordance with certain embodiments of the present disclosure.

In certain embodiments, baffle plate 1100 may have a baffle arrangement comprising parallel rows of guide baffles 1110 and separation baffles 1120, as illustrated in FIG. 2. In certain embodiments, baffle plate 1100 may a number in the range of from 10 to 60 rows of guide baffles and/or a number in the range of from 10 to 60 rows of separation baffles 1120 arranged in an alternating parallel configuration along an axial direction.

In certain embodiments, guide baffles 1110 and separation baffles 1120 may each have lengths in the range of from 4 inches (0.1 meters) to 800 inches (20.3 meters). In certain embodiments, guide baffles 1110 and separation baffles 1120 each may have lengths in the range of from 4 inches (0.1 meters) to a length equal the inner diameter of a vessel they are disposed within. In certain embodiments, each of the one or more guide baffles 1110 and/or each of the one or more separation baffles 1120 may have different lengths.

In certain embodiments, guide baffle 1110 may comprise a slanted surface 1111, top surface 1112, vertical surface 1113, bottom surface 1114, and/or protrusion 1115.

In certain embodiments, slanted surface 1111 may have a length in the range of from 3 inches to 20 inches. In certain embodiments, slanted surface 1111 may have a length in the range of from 10 inches to 15 inches. In certain embodiments, slanted surface 1111 may have a length of 12.6 inches. In certain embodiments, vertical surface 1113 may have a length in the range of from 3 inches to 20 inches. In certain embodiments, vertical surface 1113 may have a length in the range of from 10 inches to 15 inches. In certain embodiments, vertical surface 1113 may have a length of 12.8 inches. In certain embodiments, slanted surface 1111 and vertical surface 1113 may be parallel surfaces. In other embodiments, slanted surface 1111 may be inclined and/or declined with respect to vertical slanted surface in an amount in the range of from 0 degrees to 45 degrees. In other embodiments, slanted surface 1111 may be inclined and/or declined with respect to vertical slanted surface in an amount in the range of from 5 degrees to 25 degrees. In certain embodiments, as shown in FIG. 1, slanted surface 1111 may be declined 10 degrees with respect vertical surface 1113.

In certain embodiments, top surface 1112 may have a length in the range of from 0.1 inches to 6 inches. In certain embodiments, top surface 1112 may have a length in the range of from 1 inch to 4 inches. In certain embodiments, top surface 1112 may have a length of 3 inches. In certain embodiments, top surface 1112 may be a horizontal surface perpendicular to vertical surface 1113.

In certain embodiments, bottom surface 1114 may have a length in the range of from 0.1 inches to 3 inches. In certain embodiments, bottom surface 1114 may have a length in the range of from 0.5 inches to 2 inches. In certain embodiments, bottom surface 1114 may have a length of 1 inch. In certain embodiments, bottom surface 1114 may be a horizontal surface perpendicular to vertical surface 1113. In certain embodiments, not illustrated in FIG. 1, guide baffle 1110 may not comprise bottom surface 1114.

In certain embodiments, protrusion 1115 may extend from guide baffle 1110. In certain embodiments, protrusion 1115 may extend from vertical surface 1113. In certain embodiments, protrusion 1115 may have a rectangular shaped, triangular and/or tapered cross sectional shape. In certain embodiments, protrusion 1115 may be located in a range of 0 to 10 inches below top surface 1112. In certain embodiments, protrusion 1115 may be located in a range of 1 to 5 inches below top surface 1112.

In certain embodiments, protrusion 1115 may extend from guide baffle 1110 perpendicular to vertical surface 1113. In certain embodiments, protrusion 1115 may have a length in the range of from 1 inches to 13 inches. In certain embodiments, protrusion 1115 may have a length in the range of from 3 inches to 10 inches. In certain embodiments, protrusion 1115 may have a length in the range of from 0.1 inches to 4 inches. In certain embodiments, protrusion 1115 may have a length of 7 inches and a height of 1 inch.

In certain embodiments, protrusion 1115 may comprise a top surface 1116, a bottom surface 1117, and a side surface 1118. In certain embodiments, top surface 1116 and bottom surface 1117 may be parallel surfaces. In certain embodiments, side surface 1118 may be a surface perpendicular to top surface 1116 and/or bottom surface 1117. In certain embodiments, top surface 1116 and/or bottom surface 1117 may have a length in the range of from 1 inch to 13 inches. In certain embodiments, top surface 1116 and/or bottom surface 1117 may have a length in the range of from 3 inches to 10 inches. In certain embodiments, side surface 1118 may have a length in the range of from 0.1 inches to 4 inches.

In certain embodiments, separation baffle 1120 may comprise first slanted surface 1121, protrusion 1122, second slanted surface 1123, and bottom surface 1124.

In certain embodiments, first slanted surface 1121 and second slanted surface 1123 may be parallel surfaces. In certain embodiments, first slanted surface 1121 and/or second slanted surface 1123 may have lengths in the range of from 0.1 inches to 10 inches. In certain embodiments, first slanted surface 1121 and/or second slanted surface 1123 may have lengths in the range of from 2 inches to 5 inches. In certain embodiments, first slanted surface 1121 and/or second slanted surface 1123 may have a length of 3 inches.

In certain embodiments, bottom surface 1124 may be perpendicular to first slanted surface 1121 and/or second slanted surface 1123. In other embodiments, bottom surface 1124 may be inclined or declined an amount in the range of from 0 degrees to 90 degrees from first slanted surface 1121 and/or second slanted surface 1123. In certain embodiments, bottom surface 1124 may be inclined or declined an amount in the range of from 30 degrees to 80 degrees from first slanted surface 1121 and/or second slanted surface 1123. In certain embodiments, bottom surface 1124 may be declined 65.5° from first slanted surface 1121 and/or second slanted surface 1123.

In certain embodiments, protrusion 1122 may extend from separation baffle 1120. In certain embodiments, protrusion 1122 may extend from the top of separation baffle 1120. In certain embodiments, protrusion 1122 may have a rectangular, triangular, and/or a tapered cross sectional shape.

In certain embodiments, protrusion 1122 may extend from separation baffle 1120 parallel to bottom surface 1124. In certain embodiments, protrusion 1122 may have a length in the range of from 0.1 inches to 8 inches. In certain embodiments, protrusion 1122 may have a length in the range of from 2 inches to 6 inches. In certain embodiments, protrusion 1122 may have a height in the range of from 0.01 inches to 4 inches. In certain embodiments, protrusion 1122 may have a height in the range of from 0.1 inches to 2 inches. In certain embodiments, protrusion 1122 may have a length of 4.5 inches and a height of 1 inch.

In certain embodiments, protrusion 1122 may comprise a top surface 1126, a bottom surface 1127, a first side surface 1128, and a second side surface 1129. In certain embodiments, top surface 1126 and bottom surface 1127 may be parallel surfaces. In certain embodiments, first side surface 1128 and second side surface 1129 may be surfaces perpendicular to top surface 1126 and/or bottom surface 1127. In certain embodiments, top surface 1126 and/or bottom surface 1127 may have a length in the range of from 0.1 inches to 6 inches. In certain embodiments, top surface 1126 and/or bottom surface 1127 may have a length in the range of from 1 inches to 3 inches. In certain embodiments, first side surface 1128 and second side surface 1129 may have a length in the range of 0.01 inches to 6 inches. In certain embodiments, first side surface 1128 and second side surface 1129 may have a length in the range of 0.1 inches to 2 inches.

In certain embodiments, the one or more guide baffles 1110 may be spaced apart a distance in the range of from 4 inches to 25 inches. In certain embodiments, the one or more guide baffles 1110 may be spaced apart a distance in the range of from 10 inches to 20 inches. In certain embodiments, the one or more guide baffles 1110 may be spaced 13.1 inches apart. In certain embodiments, the one or more separation baffles 1120 may be spaced a distance apart in the range of from 4 inches to 25 inches apart. In certain embodiments, the one or more separation baffles 1120 may be spaced apart a distance in the range of from 10 inches to 20 inches apart. In certain embodiments, the one or more separation baffles 1120 may be spaced 13.1 inches apart.

In certain embodiments, the one or more guide baffles 1110 and separation baffles 1120 may be arranged in a manner such that the end of protrusion 1115 of a guide baffle 1110 is a distance in the range of from 0.1 inches to 15 inches from slanted surface 1111 of an adjacent guide baffle 1110. In certain embodiments, the one or more guide baffles 1110 and separation baffles 1120 may be arranged in a manner such that the end of protrusion 1115 of a guide baffle 1110 is a distance in the range of from 1 inch to 5 inches from slanted surface 1111 of an adjacent guide baffle 1110. In certain embodiments, the one or more guide baffles 1110 and separation baffles 1120 may be arranged in a manner such that the end of protrusion 1115 of a guide baffle 1110 is 3.28 inches from slanted surface 1111 of an adjacent bafflement element 1110.

In certain embodiments, the one or more guide baffles 1110 and separation baffles 1120 may be arranged in a manner such that the end of protrusion 1122 of a separation baffle 1120 is a distance in the range of from 0.1 inches to 15 inches from vertical surface 1113 of an adjacent bafflement element 1110. In certain embodiments, the one or more guide baffles 1110 and separation baffles 1120 may be arranged in a manner such that the end of protrusion 1122 of a separation baffle 1120 is a distance in the range of from 2 inches to 6 inches from vertical surface 1113 of an adjacent bafflement element 1110. In certain embodiments, the one or more guide baffles 1110 and separation baffles 1120 may be arranged in a manner such that the end of protrusion 1122 of separation baffle 1120 is 4.25 inches from vertical surface 1113 of an adjacent guide baffle 1110.

In certain embodiments, the one or more guide baffles 1110 and separation baffles 1120 may be arranged in a manner such that the top of protrusion 1115 of a guide baffle 1110 is a distance in the range of from 0.1 inches to 10 inches from the top of protrusion 1122 of an adjacent bafflement element 1120. In certain embodiments, the one or more guide baffles 1110 and separation baffles 1120 may be arranged in a manner such that the top of protrusion 1115 of a guide baffle 1110 is a distance in the range of from 2 inches to 8 inches from the top of protrusion 1122 of an adjacent bafflement element 1120. In certain embodiments, the one or more guide baffles 1110 and separation baffles 1120 may be arranged in a manner such that the top of protrusion 1115 of a guide baffle 1110 is 4.92 inches from the top of protrusion 1122 of an adjacent bafflement element 1120.

In certain embodiments, the one or more guide baffles 1110 and separation baffles 1120 may define a number of flow paths. For example, in certain embodiments, as shown in FIG. 1, two guide baffles 1110 and one separation baffle 1120 may define first flow path 1130 and/or second flow path 1140. In certain embodiments, baffle plate 1100 may comprise multiple first flow paths 1130 and multiple second flow paths 1140.

In certain embodiments, the one or more guide baffles 1110 and separation baffles 1120 may be arranged such that one or more first flows paths 1130 are defined by slanted surface 1111 of guide baffle 1100 and second slanted surface 1123 of separation baffle 1200. In certain embodiments, the one or more guide baffles 1110 and separation baffles 1120 may be arranged such that one or more second flow paths 1140 are defined by vertical surface 1113 of guide baffle 1100, first slanted surface 1121 of separation baffle 1200, protrusion 1115 of first bafflement element 1100, and protrusion 1125 of second bafflement element 1200. In certain embodiments, one or more first flow paths 1130 may cross with one or more second flow paths 1140 in a void defined by protrusion 1115 and slanted surface 1111.

In certain embodiments, first flow path 1130 may be a linear flow path. In certain embodiments, first flow path 1130 may be a solids return flow path. In certain embodiments, second flow path 1140 may be a tortious flow path comprising at least one 90° turn. In certain embodiments, second flow path 1140 may be a solids collection flow path. In certain embodiments, not illustrated in FIG. 1, solids may collect at the bend in second flow path 1140 next to first side surface 1128.

In certain embodiments, as illustrated in FIG. 2, circular baffle element 1100 may further comprise one or more support plates 1150. In certain embodiments, each of the one or more support plates 1150 may connect the one or more guide baffles 1110 and/or 1120 to an adjacent guide baffle 1110 and/or 1120. In certain embodiments, the one or more support plates may be constructed out of carbon steel. In certain embodiments, the one or more support plates 1150 may be perpendicular to the one or more guide baffles 1110 and/or 1120.

In certain embodiments, as illustrated in FIG. 2, circular baffle element 1100 may comprise one or more dipleg holes 1160. In certain embodiments, the one or more dipleg holes 1160 may permit a dipleg from a cyclone to pass through circular baffle element 1100. In certain embodiments, the one or more dipleg holes 1160 may have a diameter in the range of from 1 inch to 30 inches. In certain embodiments, the one or more dipleg holes 1160 may have a diameter in the range of from 5 inch to 15 inches. In certain embodiments, circular baffle element 1100 may comprise one, two, three, four, five, six, or more dipleg holes 1160.

Figure 3:
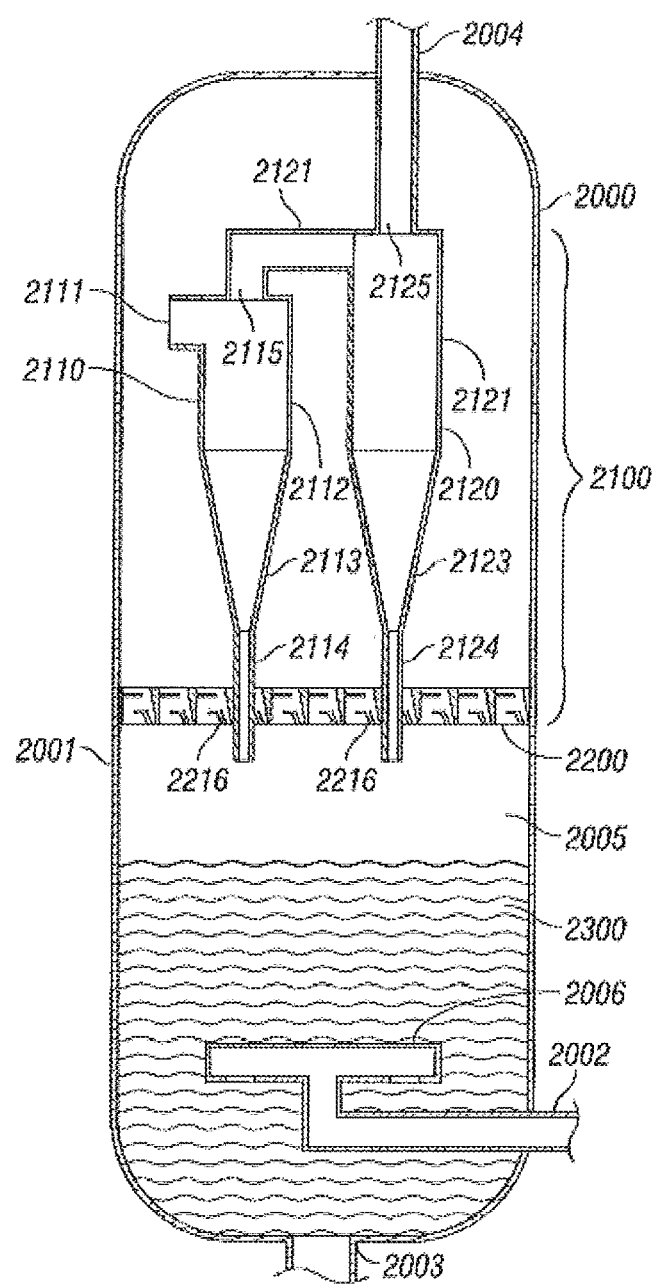
FIG. 3 illustrates a cross sectional view of a vessel comprising a particle disengagement device in accordance with certain embodiments of the present disclosure.

In certain embodiments, the present disclosure provides a vessel comprising: a fluidized bed, one or more cyclones, and a particle disengagement device, wherein the particle disengagement device is disposed within the vessel at an elevation above the fluidized bed and below the one or more cyclones. Referring now to FIG. 3, FIG. 3 illustrates a cross sectional view of a vessel 2000 comprising one or more cyclones 2100 and a particle disengagement device 2200.

In certain embodiments, vessel 2000 may comprise any conventional vessel used in the separation of solids from gases. In certain embodiments, vessel 2000 may comprise a regenerator vessel or any other vessel comprising a fluidized bed. In certain embodiments, vessel 2000 may comprise any conventional separation chamber used in the separation of FCC catalyst from gasses.

In certain embodiments, vessel 2000 may comprise housing 2001, gas/solids inlet 2002, solids outlet 2003, and gas outlet 2004.

In certain embodiments, housing 2001 may comprise any conventional housing used in conventional separation vessels. In certain embodiments, housing 2001 may be constructed of metals, metal alloys, and/or ceramics and may be lined with erosion resistant coatings or ceramic lining. In certain embodiments, housing 2001 may have a cylindrical shape with an inner diameter and an inner length. In certain embodiments, housing 2001 may define a hollow interior 2005.

In certain embodiments, housing 2001 may have an inner diameter in the range of from 1 foot to 50 feet. In certain embodiments, housing 2001 may have an inner diameter in the range of from 10 feet to 20 feet. In certain embodiments, housing 2001 may have an inner length in the range of from 5 feet to 250 feet. In certain embodiments, housing 2001 may have an inner length in the range of from 10 feet to 100 feet.

In certain embodiments, gas-solids inlet 2002 may be positioned along a side of housing 2001. In certain embodiments, gas-solids inlet 2002 may permit the flow of gas and solids into vessel 2000. In certain embodiments, gas-solids inlet 2002 may be sized to allow the flow of gas and solids into vessel 2000 at gas flow rates in the range of from 10,000 SCFM to 500,000 SCFM. In certain embodiments, gas-solids inlet 2002 may be sized to allow the flow of gas and solids into vessel 2000 at gas flow rates in the range of from 20,000 SCFM to 250,000 SCFM. In certain embodiments, the gas-solids inlet 2002 may be sized to allow for the formation of a fluidized bed 2300 within vessel 2000.

In certain embodiments, gas-solids inlet 2002 may be connected to a distributor 2006. In certain embodiments, distributor 2006 may comprise any conventional distributor used in FCC separation vessels.

In certain embodiments, solids outlet 2003 may be positioned along a bottom of housing 2001. In certain embodiments, solids outlet 2002 may permit the flow solids out of vessel 2000. In certain embodiments, gas outlet 2004 may be positioned along a top of housing 2001. In certain embodiments, gas outlet 2004 may permit the flow of gas out of vessel 2000.

In certain embodiments, the one or more cyclones 2100 may comprise a combination of primary cyclones and/or secondary cyclones. In certain embodiments, not shown in FIG. 3, the one or more cyclones 2100 may only comprise one or more primary cyclones. In other embodiments, as shown in FIG. 3, the one or more cyclones may comprise one or more primary cyclones 2110 and one or more secondary cyclones 2120. In certain embodiments, as shown in FIG. 3, the one or more cyclones 2100 may comprise one primary cyclone 2110 and one secondary cyclone 2120. In other embodiments, the one or more cyclones 2100 may comprise multiple primary cyclones 2110 and multiple secondary cyclones 2120.

In certain embodiments, primary cyclone 2110 may comprise any conventional primary cyclone used in FCC separators. In certain embodiments, secondary cyclone 2120 may comprise any conventional secondary cyclone used in FCC separators.

In certain embodiments, primary cyclone 2110 may comprise inlet 2111, cyclone body 2112, conical section 2113, dipleg 2114, and outlet 2115.

In certain embodiments, primary cyclone 2110 may be positioned within vessel 2000 such that inlet 2111 is above particle disengagement device 2200. In certain embodiments, inlet 2111 may be placed a distance in the range of from 1 foot to 25 feet above fluidized bed 2300. In certain embodiments, inlet 2111 may be placed a distance in the range of from 5 feet to 100 feet above fluidized bed 2300. In certain embodiments, inlet 2111 may allow a mixture of gas and solids to enter into cyclone body 2112. In certain embodiments, the volume fraction of solids in the mixture may be a volume fraction in the range of from 0.01 to 0.3. In certain embodiments, the volume fraction of solids in the mixture may be volume fraction in the range of from 0.05 to 0.2.

In certain embodiments, cyclone body 2112 may comprise any conventional cyclone body. In certain embodiments, conical section 2113 may comprise any conventional conical section.

In certain embodiments, dipleg 2114 may comprise any conventional dipleg. In certain embodiments, dipleg 2114 may extend into through a dipleg hole 2216 in particle disengagement device 2200. In certain embodiments, dipleg 2114 may extend into fluidized bed 2300. In certain embodiments, dipleg 2114 may permit a mixture of gas and solids to exit primary cyclone 2110 and return hollow interior 2005. In certain embodiments, the volume fraction of solids in the dipleg may be a volume fraction in the range of from 0.2 to 0.6.

In certain embodiments, outlet 2115 may be positioned at a top of primary cyclone 2110. In certain embodiments, inlet 2111 may allow a mixture of gas and solids to exit primary cyclone 2110 and enter secondary cyclone 2120 through inlet 2121. In certain embodiments, the mixture of gas and solids may have a loading that is in the range of from 1% to 20% of the loading to the primary cyclone 2110.

In certain embodiments, secondary cyclone 2120 may comprise inlet 2121, cyclone body 2122, conical section 2123, dipleg 2124, and outlet 2125.

In certain embodiments, secondary cyclone 2120 may be positioned within vessel 2000 such that inlet 2121 is positioned at outlet 2115 of primary cyclone 2110. In certain embodiments, inlet 2121 may allow a mixture of gas and solids from primary cyclone 2110 to enter into cyclone body 2122.

In certain embodiments, cyclone body 2122 may comprise any conventional cyclone body. In certain embodiments, conical section 2123 may comprise any conventional conical section.

In certain embodiments, dipleg 2124 may comprise any conventional dipleg. In certain embodiments dipleg 2124, may extend into through a dipleg hole 2216 in particle disengagement device 2200. In certain embodiments, dipleg 2124 may extend into fluidized bed 2300. In certain embodiments, dipleg 2124 may permit a mixture of gas and solids to exit secondary cyclone 2120 and return hollow interior 2005. In certain embodiments, the volume fraction of solids in the dipleg 2124 may be a volume fraction in the range of from 0.2 to 0.6.

In certain embodiments, outlet 2125 may be positioned at a top of secondary cyclone 2120. In certain embodiments, outlet 2125 may allow a mixture of gas and solids to exit secondary cyclone 2120 and exit vessel 2000. In certain embodiments, the mixture of gas and solids exiting secondary cyclone 2120 may have a volume fraction of solids in the range of from 0.001 to 0.1.

In certain embodiments, particle disengagement device 2200 may comprise any combination of features discussed above with respect to particle disengagement device 1000. In certain embodiments, particle disengagement device 2200 may comprise a baffle plate 2210. In certain embodiments, baffle plate 2210 may comprise any combination of features discussed above with respect to baffle plate 1100.

In certain embodiments, baffle plate 2210 may comprise first flow paths 2211 and one or more second flow paths 2212. In certain embodiments, first flow path 2211 may comprise any combination of features discussed above with respect to first flow path 1130. In certain embodiments, second flow path 2212 may comprise any combination of features discussed above with respect to second flow path 1140.

In certain embodiments, baffle plate 2210 may further comprise one or more guide baffles 2214 and one or more separation baffles 2215. In certain embodiments, the one or more first bafflement elements 2214 and/or the one or more separation baffles 2215 may define the one or more gas flow paths 2211 and the one or more solid flow paths 2212. In certain embodiments, the one or more guide baffles 2214 may comprise any combination of features discussed above with respect to guide baffles 1110. In certain embodiments, the one or more separation baffles 2215 may comprise any combination of features discussed above with respect to separation baffles 1120.

In certain embodiments, baffle plate 2210 may further comprise one or more dipleg holes 2216. In certain embodiments, the one or more dipleg holes 2216 may comprise any combination of features discussed above with respect to dipleg holes 1160.

In certain embodiments, particle disengagement device 2200 may be positioned within vessel 2000 at a height above fluidized bed 2300. In certain embodiments, particle disengagement device 2200 may be positioned within vessel 2000 at a height below a portion of primary cyclone 2110 and/or 2120. In certain embodiments, particle disengagement device 2200 may be positioned within a vessel 2000 at a height such that dipleg 2124 and/or dipleg 2114 are partially disposed within dipleg holes 2216.

In certain embodiments, particle disengagement device 2200 may be sized to have the same diameter of the inner diameter of vessel 2000. In certain embodiments, particle disengagement device 2200 may be welded to the housing 2001.

In certain embodiments, the present disclosure provides a method comprising: providing a vessel, wherein the separation vessel comprises fluidized bed, one or more cyclones, and a particle disengagement device, wherein the particle disengagement device is disposed within the vessel at an elevation above the fluidized bed and below a portion of the one or more cyclones; and introducing an air/catalyst feed into the vessel.

In certain embodiments, the vessel may comprise any combination of features discussed above with respect to vessel 2000. In certain embodiments, the one or more cyclones may comprise one or more primary cyclones and one or more secondary cyclones. In certain embodiments, the one or more primary cyclones may comprise any combination of features discussed above with respect to primary cyclone 2110. In certain embodiments, the one or more secondary cyclones may comprise any combination of features discussed above with respect to secondary cyclone 2120. In certain embodiments, the particle disengagement device may comprise any combination of features discussed above with respect to particle disengagement device 2200 and/or particle disengagement device 1000.

In certain embodiments, introducing an air/catalyst feed into the vessel may comprise introducing a flow of gas and solids into the vessel at a gas flow rate in the range of from 10,000 SCFM to 500,000 SCFM.

In certain embodiments, the method may further comprise removing solids from the air/catalyst feed. In certain embodiments, the method may further comprise allowing a mixture of gas and solids to enter into the one or more primary cyclones. In certain embodiments, the volume fraction of solids in the mixture introduced into the one or more primary cyclones may be a volume fraction in the range of from 0.01 to 0.3. In certain embodiments, the method may further comprise allowing a mixture of gas and solids to exit the one or more primary cyclones through one or more diplegs. In certain embodiments, the volume fraction of solids in the mixture exciting the one or more primary cyclones may be a volume fraction in the range of form 0.2 to 0.6.

In certain embodiments, the method may further comprise allowing a mixture of gas and solids to exit the one or more primary cyclones through an outlet and enter into one or more secondary cyclones. In certain embodiments, the volume fraction of solids in the mixture introduced into the one or more secondary cyclones may have a loading that is in the range of from 1% to 20% of the loading of the mixture that is introduced into the one or more primary cyclones.

In certain embodiments, the method may further comprise allowing a mixture of gas and solids to exit the one or more secondary cyclones through one or more diplegs. In certain embodiments, the volume fraction of solids in the mixture exciting the one or more secondary cyclones may be a volume fraction in the range of form 0.2 to 0.6.

In certain embodiments, the method may further comprise allowing a mixture of gas and solids to exit the one or more secondary cyclones through one or more outlets. In certain embodiments, the volume fraction of solids in the mixture exiting the one or more secondary cyclones through the one or more outlets may have a loading that is in the range of from 1% to 20% of the loading of the mixture that is introduced into the one or more primary cyclones.

To facilitate a better understanding of the present invention, the following examples of specific embodiments are given. In no way should the following examples be read to limit, or to define, the scope of the invention.

EXAMPLES

Example 1

Figure 4:
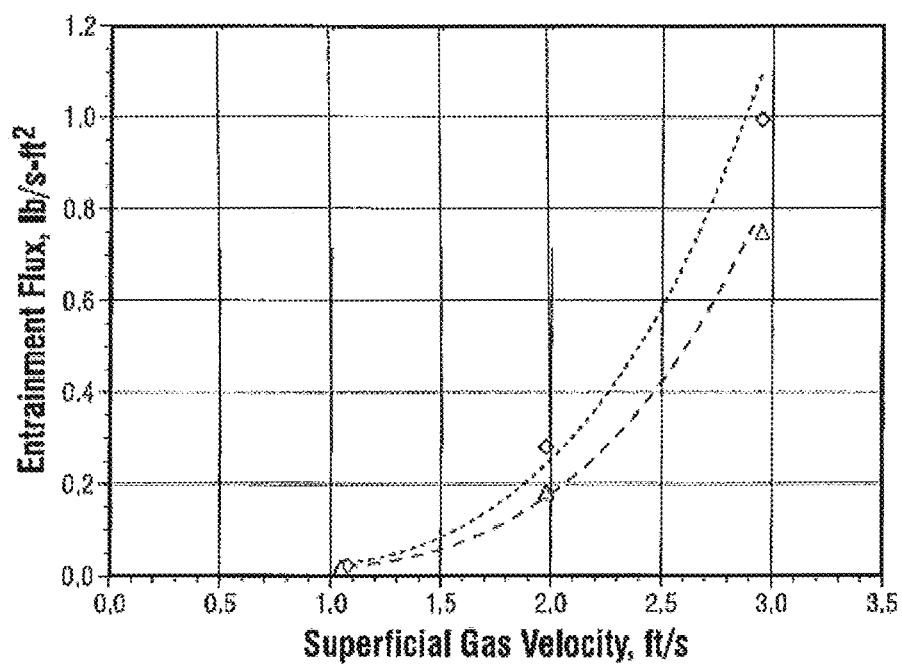
FIG. 4 is a chart depicting the relationship between entrainment flux and superficial gas velocities in separation vessels.
Figure 5:
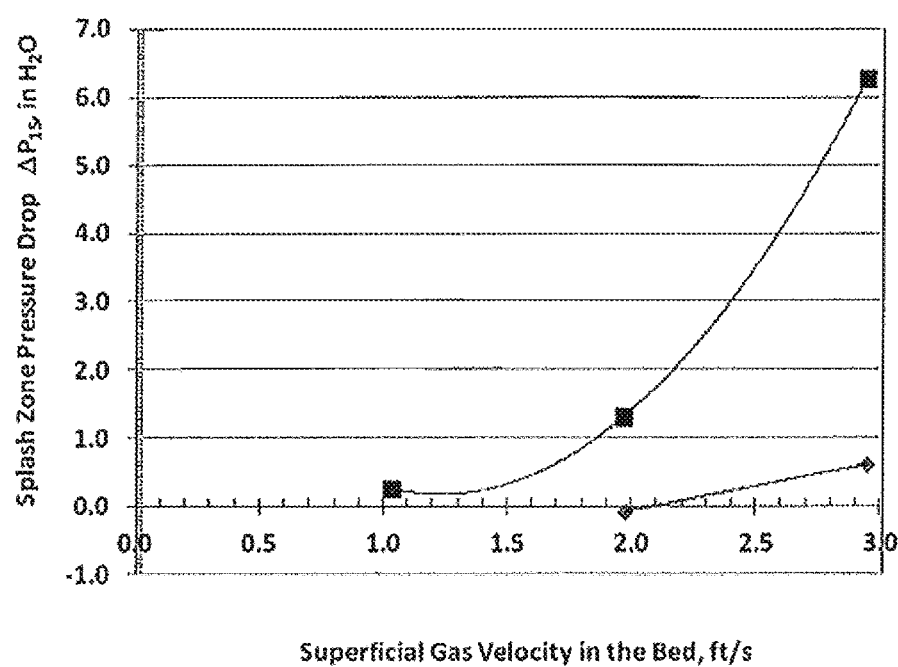
FIG. 5 is a chart depicting the relationship between splash zone pressure drop and superficial gas velocities in separation vessels.

The effect a particle disengagement device in accordance to certain embodiments of the present disclosure has on the entrainment flux was measured. A 5 foot semi-circular vessel was provided with a fluidized bed height of 5 feet. A mixture of an FCC catalyst and gas was passed through the vessel at superficial gas velocities of 1.03 ft/s, 1.97 ft/s, and 2.95 ft/s and the entrainment flux at each of these velocities was measured. A particle disengagement device in accordance to certain embodiments of the present disclosure as then installed in the vessel at a height of 8 feet from the distributor. The same mixture of the FCC catalyst and gas was then passed through the vessel at superficial gas velocities of 1.03 ft/s, 1.97 ft/s, and 2.95 ft/s and the entrainment flux at each of these velocities was measured. FIGS. 4 and 5 illustrate the results of the tests.

As can be seen by FIG. 4, at a flow rate of 1.03 ft/s, the placement of the particle disengagement device results in a 38.5% reduction in entrainment, at a flow rate of 1.97 ft/s, the placement of the particle disengagement device resulted in a 34.7% reduction in entrainment, and at a low rate of 2.95 ft/s, the placement of the particle disengagement device resulted in a 24.2% decrease in entrainment.

As can be seen by FIG. 5, at a flow rate of 3 ft/s, the placement of the particle disengagement device results in a 6 inches $H_2O$ (0.2 psi) pressure increase, at a flow rate of 2 ft/s, the placement of the particle disengagement device results in a 1.2 inches $H_2O$ (0.04 psi) pressure increase, at a flow rate of 1 ft/s, the placement of the particle disengagement device results in a 0.2 inches $H_2O$ (0.006 psi) pressure increase.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A vessel comprising:
   a fluidized bed;
   one or more cyclones; and
   a particle disengagement device comprising
      a circular baffle plate,
      wherein the circular baffle plate comprises one or more guide baffles and one or more separation baffles,
      wherein the one or more guide baffles and the one or more separation baffles define one or more air flow paths and one or more solid flow paths;
      wherein the one or more guide baffles and the one or more separation baffles each comprise a protrusion having a length in the range of from 0.1 to 8 inches;
      wherein the one or more guide baffles are spaced apart a distance in the range of from 4 inches to 25 inches; and
      wherein the one or more separation baffles are spaced apart a distance in the range of from 4 inches to 25 inches.

2. The vessel of claim 1, wherein the one or more cyclones comprise one or more primary cyclones and one or more secondary cyclones.

3. The vessel of claim 2, wherein the one or more cyclones comprise one or more diplegs.

4. The vessel of claim 3, wherein the one or more diplegs extend through the particle disengagement device.

5. The vessel of claim 1, wherein the circular baffle plate has a diameter in the range of from 1 meter to 15 meters.

6. The vessel of claim 1, wherein the circular baffle plate has a height in the range from 1 inch to 20 inches.

7. The vessel of claim 1, wherein the one or more guide baffles comprise 10 to 60 guide baffles and the one or more separation vessel comprise 10 to 60 separation baffles.

8. The vessel of claim 1, wherein the protrusion has a rectangular cross-sectional shape.

9. A method comprising:
   providing a vessel, wherein the vessel comprises:
      a fluidized bed;
      one or more cyclones; and
      a particle disengagement device:
         wherein the particle disengagement device comprises a circular baffle plate comprising one or more guide baffles and one or more separation baffles, and wherein the particle disengagement device is disposed within the vessel at an elevation above the fluidized bed and below a portion of the one or more cyclones; and introducing a gas/solid feed into the vessel.

10. The method of claim 9, further comprising removing solids from the gas/solid feed.

11. The method of claim 9, wherein the one or more guide baffles and the one or more separation baffles each comprise a protrusion having a length in the range of from 0.1 to 8 inches.

12. The method of claim 11, wherein the protrusion has a rectangular cross-sectional shape.

13. The method of claim 9, wherein the one or more guide baffles are spaced apart a distance in the range of from 4 inches to 25 inches.

14. The method of claim 9, wherein the one or more separation baffles are spaced apart a distance in the range of from 4 inches to 25 inches.

15. The method of claim 9, wherein the one or more cyclones comprise one or more diplegs.

16. The method of claim 9, wherein the one or more guide baffles comprise 10 to 60 guide baffles and the one or more separation vessel comprise 10 to 60 separation baffles.

\* \* \* \* \*

UNITED STATES PATENT AND TRADEMARK OFFICE
CERTIFICATE OF CORRECTION

PATENT NO. : 11,071,958 B2  Page 1 of 1
APPLICATION NO. : 16/833930
DATED : July 27, 2021
INVENTOR(S) : Cian Seamus Carroll It is certified that error appears in the above-identified patent and that said Letters Patent is hereby corrected as shown below:

In the Specification

In Column 1, Line 4, delete "APPLICATON" and insert -- APPLICATION --, therefor.

In Column 1, Line 9, delete "PCT/US2016/0603217," and insert -- PCT/US2016/063217, --, therefor.

Signed and Sealed this
Fifth Day of October, 2021

Drew Hirshfeld
*Performing the Functions and Duties of the
Under Secretary of Commerce for Intellectual Property and
Director of the United States Patent and Trademark Office*